United States Patent [19]
Mueller et al.

[11] Patent Number: 6,059,234
[45] Date of Patent: May 9, 2000

[54] PAYLOAD MODULE

[75] Inventors: George E. Mueller, Kirkland; David B. Cochran, Bellevue, both of Wash.

[73] Assignee: Kistler Aerospace Corporation, Kirkland, Wash.

[21] Appl. No.: 09/034,038

[22] Filed: Feb. 25, 1998

[51] Int. Cl.[7] .................................................. B64G 1/00
[52] U.S. Cl. ................................ 244/158 R; 244/118.1; 244/129.4
[58] Field of Search .................................... 244/2, 158 R, 244/160, 161, 162, 118.1, 129.4, 129.5

[56] References Cited

U.S. PATENT DOCUMENTS

| | | | |
|---|---|---|---|
| 3,210,026 | 10/1965 | Frisch | 244/159 |
| 3,300,162 | 1/1967 | Maynard et al. | 244/159 |
| 3,384,016 | 5/1968 | Blanchard, Jr. | 102/49.5 |
| 3,653,615 | 4/1972 | Spence | 244/137 |
| 3,703,998 | 11/1972 | Girard | 244/120 |
| 3,845,921 | 11/1974 | Thompson et al. | 244/158 |
| 3,952,976 | 4/1976 | Fletcher et al. | 244/158 |
| 4,132,373 | 1/1979 | Lang | 244/120 |
| 4,265,416 | 5/1981 | Jackson et al. | 244/2 |
| 4,562,979 | 1/1986 | Taylor | 244/158 R |
| 4,625,519 | 12/1986 | Ceniza | 89/1.57 |
| 4,842,223 | 6/1989 | Allton et al. | 244/158 R |
| 4,860,975 | 8/1989 | Schliesing et al. | 244/161 |
| 5,086,999 | 2/1992 | Mullen | 244/159 |
| 5,217,188 | 6/1993 | Thole et al. | 244/172 |
| 5,295,642 | 3/1994 | Palmer | 244/2 |
| 5,456,424 | 10/1995 | Palmer | 244/2 |
| 5,564,648 | 10/1996 | Palmer | 244/2 |
| 5,568,901 | 10/1996 | Steinnon | 244/63 |
| 5,626,310 | 5/1997 | Kelly | 244/2 |
| 5,667,167 | 9/1997 | Kistler | 244/110 E |
| 5,743,492 | 4/1998 | Chan et al. | 244/118.2 |

OTHER PUBLICATIONS

"Manned Earth Satellites", Interavia, No. 7, pp860–862, 1960.

A. P. Bruckner, et al., "IAF 92–0859 Antares: A Low Cost Modular Launch Vehicle Concept," *43rd Congress of The International Astronautical Federation*, Aug. 28–Sep. 5, 1992, 14 pages.

H. O. Ruppe, "Design Considerations for Future Space Launchers,"*Acta Astronautica*(?), vol. 29, No. 9, 1993, pp. 705–722 (printed in Great Britain) Pergamon Press, Ltd.

Steven J. Isakowitz, "International Reference Guide to Space Launch Systems, "*American Institute of Aeronautics and Astronautics,*, 1991, 295 pages.

Philip Bono, "The Reusable Booster Pardox—Aircraft Technology or Operations?", *Spaceflight*, date unknown, pp. 379–382.

D. E. Koelle, et al., "The Single–Stage Resuable Ballistic Launcher Concept for Economic Cargo Transportation," *37th Congress of The International Astronautical Federation*, Oct., 1986, 7 pages.

Maxwell W. Hunter, "Draft II—The SSX Spaceship, Experimental," source unknown, Mar. 15, 1988, updated Mar. 11, 1989, 34 pages.

*Primary Examiner*—Galen L. Barefoot
*Attorney, Agent, or Firm*—Baker Botts L.L.P.

[57] ABSTRACT

A payload module couples to a forward end of a re-entry vehicle. The payload module includes a cap and a fairing to contain a payload during ascent of the vehicle and to withstand aerodynamic heating from the atmosphere upon re-entry of the vehicle. In a particular embodiment, the fairing has an extended position to contain the payload and a retracted position for re-entry into the atmosphere after payload deployment.

40 Claims, 6 Drawing Sheets

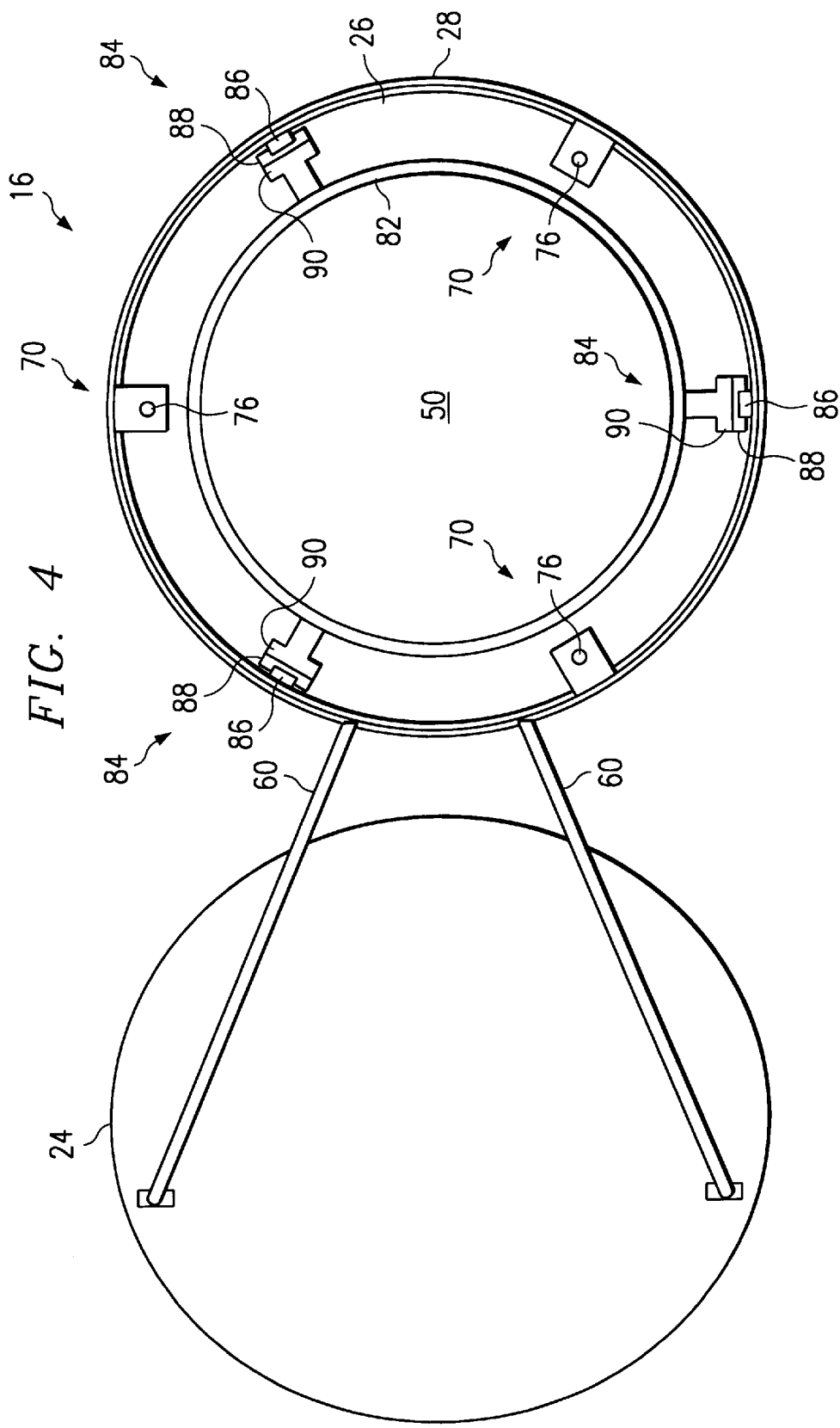

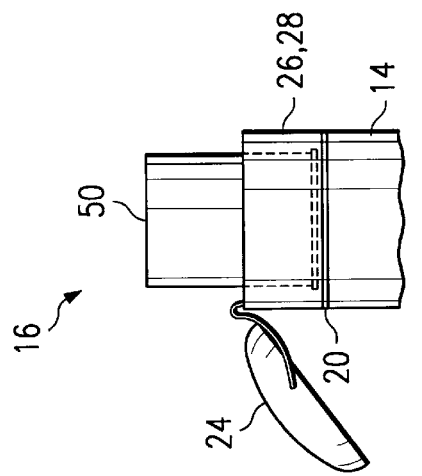
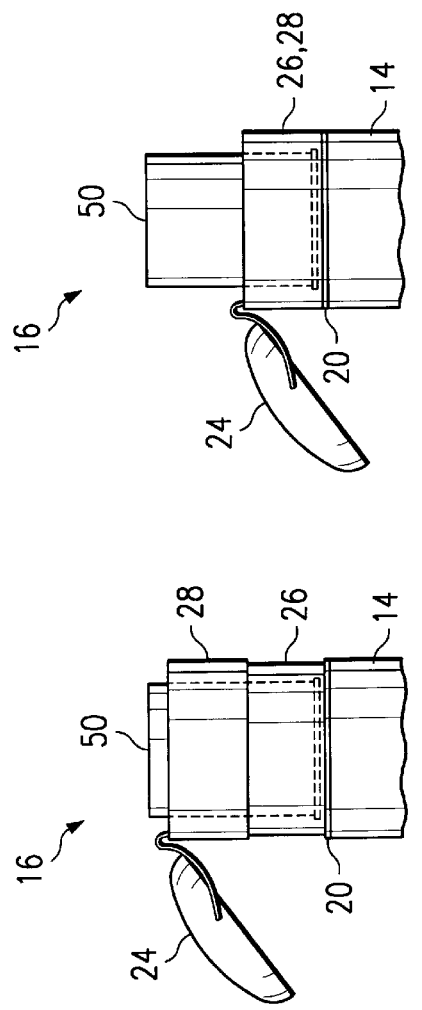
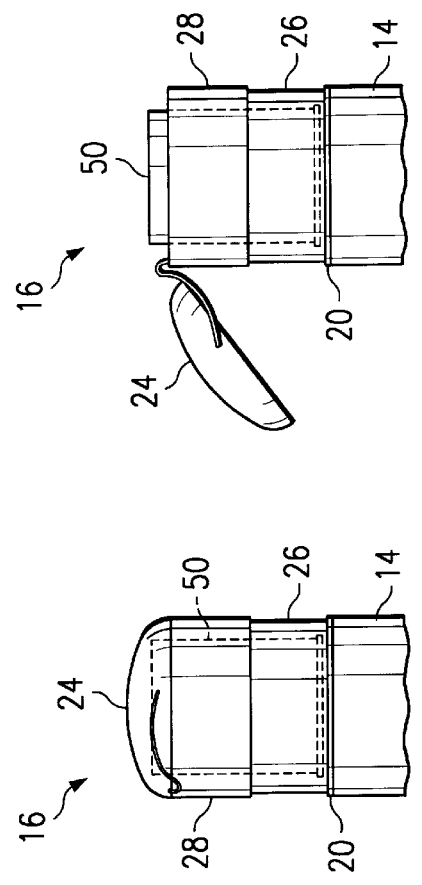
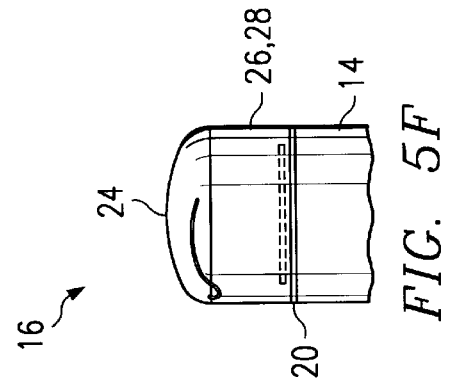
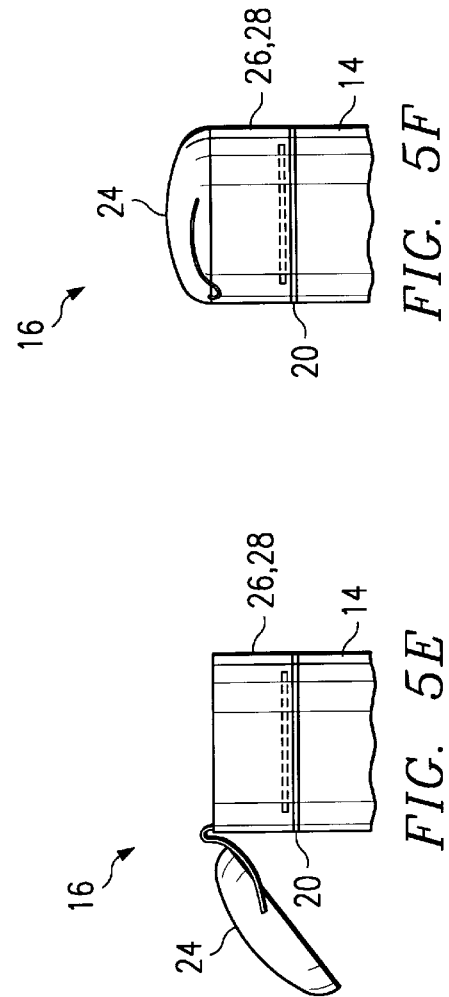
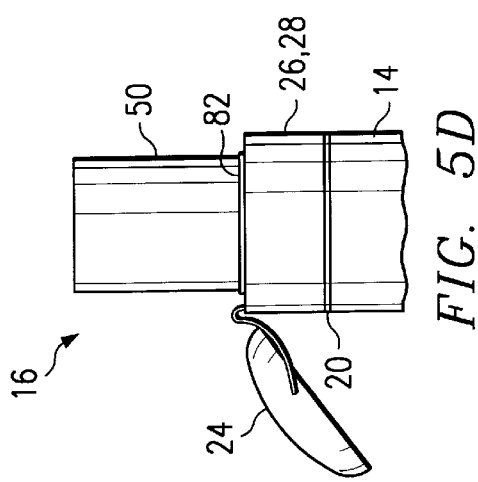

6,059,234

PAYLOAD MODULE

TECHNICAL FIELD OF THE INVENTION

The present invention relates generally to space vehicles, and more particularly to a payload module for a space vehicle.

BACKGROUND OF THE INVENTION

Space satellites either alone or in constellations provide a variety of communication services to subscribers. As subscribers demand more bandwidth and connectivity to support increases in voice, video, and data communication, there is an associated need for satellite communication systems. Also, with increased efforts to explore and exploit space, there is a need for delivery of a variety of payloads to orbiting space stations and beyond. The existing launch systems that place communication satellites and other payloads into space are primarily expendable vehicles.

Several expendable space vehicles mount a payload in a fairing attached to the forward end of the vehicle. The fairing protects the payload during ascent. In preparation for payload deployment, these prior systems fire explosive bolts, release fairing panels, or perform other similar activities to deploy the payload. Prior fairing design and operation does not contemplate re-entry of at least a portion of the vehicle and does not contemplate reuse of the payload fairing.

SUMMARY OF THE INVENTION

In accordance with the present invention, a payload module is provided that substantially eliminates or reduces disadvantages or problems associated with previously developed payload fairings. In particular, the present invention provides a reusable payload module that both encloses a payload during ascent of a space vehicle and withstands atmospheric re-entry. In a particular embodiment, the payload module has an extended position to contain a payload and a retracted position for re-entry into the atmosphere.

In one embodiment of the present invention, a payload module coupled to a forward end of a re-entry vehicle includes a fairing having an extended position to contain a payload and a retracted position for re-entry into the atmosphere. A cap coupled to the fairing has a closed position to contain a payload and an open position to deploy the payload.

In another embodiment of the present invention, a payload module removably coupled to a forward end of a re-entry vehicle includes a fairing that contains a payload during ascent of the vehicle and withstands aerodynamic heating from the atmosphere upon re-entry of the vehicle. A cap coupled to the fairing has a closed position to contain the payload and an open position to deploy the payload. The payload module also includes a base coupled to the fairing and a number of fasteners removably coupled to the base and the forward end of the vehicle.

Technical advantages of the present invention include a reusable payload module attached to a forward end of a space vehicle. The payload module encloses a payload upon ascent of the vehicle and withstands aerodynamic heating from the atmosphere upon re-entry. In a particular embodiment, the payload module has an extended position to contain a payload and a retracted position for re-entry into the atmosphere. The retracted position moves the center of pressure of the vehicle with respect to the center of gravity to improve stability and steerability upon re-entry. The extended and retracted positions for the payload module also provide increased and adjustable payload geometries.

In a particular embodiment, a payload module includes an aft fairing, a forward fairing, and one or more fairing actuators to retract the forward fairing in a telescoping fashion in preparation for satellite deployment and re-entry. The payload module may also include an integral or separate elevator having an extended position to deploy the payload in either an axial or lateral manner. A cap coupled to the forward fairing by a hinge has a closed position to enclose a payload and an open position to deploy the payload. The cap as a leading portion of the vehicle upon ascent and re-entry includes suitable tiles, ablative materials, and thermal insulation to withstand aerodynamic heating.

Other technical advantages of the present invention include a payload module removably coupled to a forward end of a space vehicle. This modularity allows the fairing to be transported to a remote site for payload integration. After launch, payload deployment, re-entry, and vehicle recovery, the modular fairing may be decoupled from the vehicle. Ground operations then refurbish the fairing and load another payload for launch. Spare payload modules may be delivered to payload integrators in advance of the launch date. Furthermore, horizontal integration, testing, and checkout of the payload module and space vehicle further reduces the costs and complexity of launch services. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which:

FIG. 4 illustrates a top view of the payload module in the retracted position;

FIGS. 5A–5F illustrate a sequence of operation of the payload module; and

DETAILED DESCRIPTION OF THE INVENTION

Figure 1:
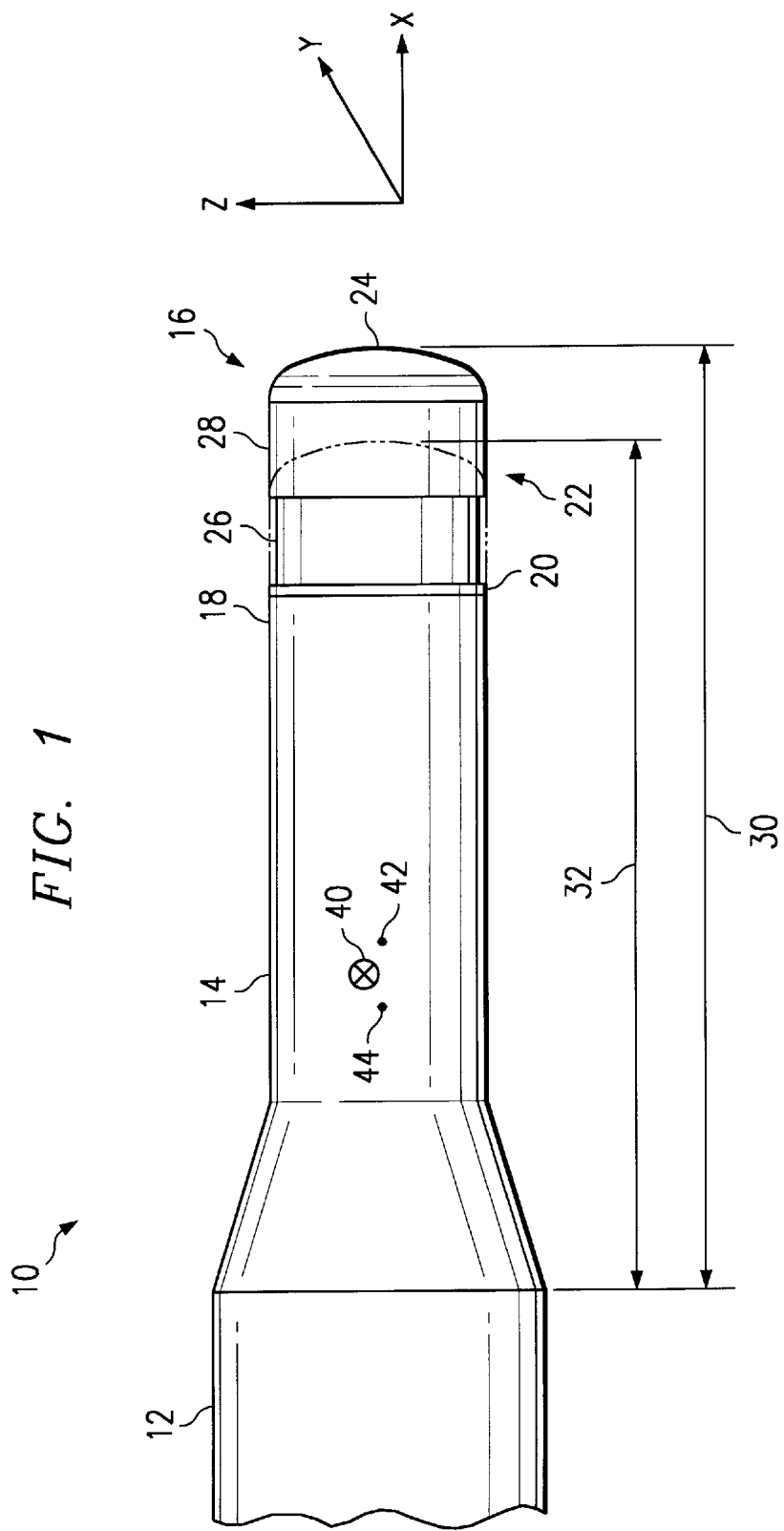
FIG. 1 illustrates a space vehicle having a payload module constructed in accordance with the teachings of the present invention.

FIG. 1 illustrates a launch vehicle 10 that includes one or more booster stages 12, an upper stage or re-entry vehicle 14, and a payload module 16 coupled to a forward end 18 of re-entry vehicle 14. Launch vehicle 10, booster stage 12, and re-entry vehicle 14 are referred to individually or in combination as a space vehicle. Generally, payload module 16 encloses a payload during ascent of vehicle 10 and withstands aerodynamic heating from the atmosphere upon return of re-entry vehicle 14 to a designated landing area. Upon recovery of re-entry vehicle 14, ground operations decouple payload module 16 from re-entry vehicle 14 for refurbishment and reuse in additional launches.

Payload module 16 generally includes a base 20, a fairing 22, and a cap 24. In a particular embodiment, fairing 22 includes an aft fairing 26 coupled to base 20, and a forward fairing 28 coupled to aft fairing 26 and cap 24. Base 20 provides sufficient structural support for the payload enclosed by payload module 16, and removably couples to forward end 18 of re-entry vehicle 14 using a number of suitable fasteners. Cap 24, as the leading edge of launch vehicle 10 upon ascent and the leading edge of re-entry vehicle 14 upon return, includes appropriate thermal tiles, ablative materials (e.g., cork, goop, aerogel), or other suitable thermal protection material to withstand aerodynamic heating from the atmosphere. These thermal protection materials may also be placed at strategic locations on re-entry vehicle 14 and other portions of vehicle 10 that experience aerodynamic heating. Furthermore, payload module 16 may include suitable thermal barriers and seals at joints between components of payload module 16.

The particular embodiment of fairing 22 illustrated throughout this description includes aft fairing 26 and forward fairing 28. However, fairing 22 may include more than two members that cooperatively operate to reduce the length of fairing 22 and provide both axial and lateral payload deployment capabilities. Moreover, fairing 22 may include a single fairing without a retraction or telescoping capability. In this particular embodiment, fairing 22 does not retract, but cooperates with cap 24 for deploying the payload.

In a particular embodiment, fairing 22 has an extended position to contain a payload and a retracted position for re-entry into the atmosphere. The extended position results in a length 30 for re-entry vehicle 14, whereas the retracted position showing cap 24 in dashed lines results in a reduced length 32 of re-entry vehicle 14. In a specific implementation, length 30 is approximately 57.3 feet and reduced length 32 is approximately 51.1 feet.

Reduced length 32 of re-entry vehicle 14 after payload deployment and fairing retraction increases stability and steerability of vehicle 14 during re-entry into the atmosphere. Vehicle 14 maintains a center of gravity 40 after payload deployment, which may adjust in response to the use of fuel for orbital maneuvering and attitude control. In the illustrated embodiment, fairing 22 in an extended position places a first center of pressure 42 forward of center of gravity 40. This may cause a reduction in the stability and steerability of vehicle 14 upon re-entry. However, fairing 22 in a retracted position places a second center of pressure 44 aft of center of gravity 40, which improves stability and steerability of re-entry vehicle 14. The location of second center of pressure 44 may also improve the lift-to-drag (L/D) ratio of vehicle 14. Second center of pressure 44 is shown aft of center of gravity 40. However, launch vehicle 10 contemplates any adjustment to the center of pressure as a result of the retraction of fairing 22 that moves the center of pressure with respect to center of gravity 40 to improve the stability and steerability of vehicle 14.

Figure 2:
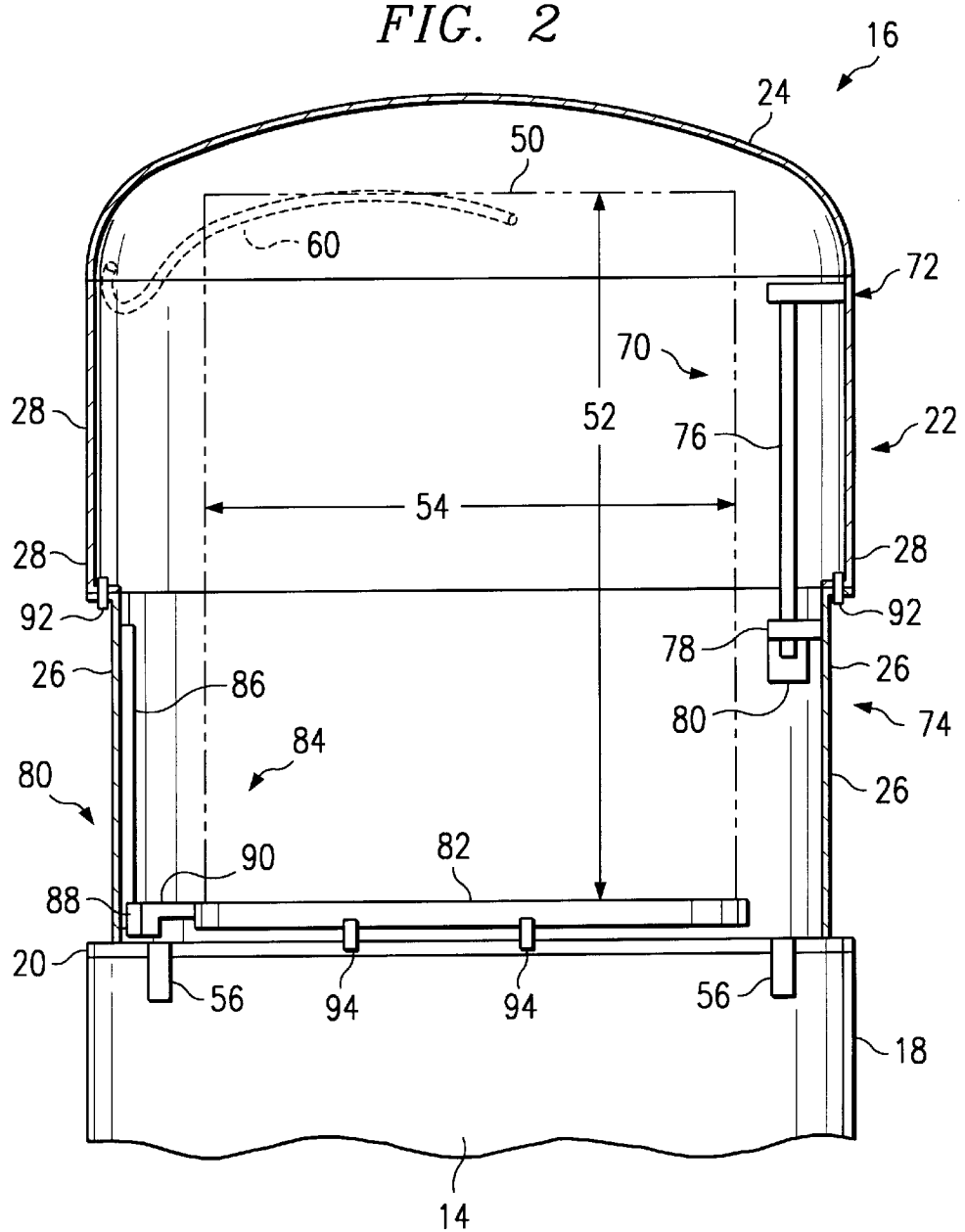
FIG. 2 illustrates in detail the payload module in an extended position.

FIG. 2 illustrates in more detail fairing 22 in an extended position to enclose a payload 50 having a maximum height 52 and a maximum width 54. The general shape of payload 50 may be cylindrical to maximize available volume, spherical, rectangular, or any other suitable shape. Base 20 of payload module 16 couples to forward end 18 of vehicle 14 using fasteners 56. A series of fasteners 56 located around the perimeter of base 20 couple payload module 16 to vehicle 14. Fasteners 56 may comprise screws, bolts, pegs, or other suitable devices located and oriented in any particular fashion that removably couple payload module 16 to vehicle 14. In a particular embodiment, fasteners 56 allow coupling of payload module 16 to vehicle 14 without accessing the internal space enclosed by payload module 16. This allows payload module 16 to be loaded and sealed in a clean room environment, and then transported to a launch facility for coupling to forward end 18 of vehicle 14 without sacrificing the clean room seal.

Fairing 22 includes aft fairing 26 and forward fairing 28. The diameter of aft fairing 26 is less than the diameter of forward fairing 28 so that forward fairing 28 can move over aft fairing 26 in a telescoping manner to the retracted position. In a particular embodiment, the diameter of forward fairing 28 is approximately equal to the diameter of re-entry vehicle 14 at its forward end 18. This arrangement reduces or eliminates sharp edges or corners on payload module 16 that may cause undesirable concentrations of aerodynamic heating and loads upon reentry into the atmosphere.

Cap 24 of payload module 16 couples to forward fairing 28 using a hinge 60. Hinge 60 allows cap 24 to have a closed position as shown in FIG. 2, and an open position (FIG. 3) to deploy payload 50. The design of hinge 60, as described below in more detail with reference to FIGS. 3 and 4, maximizes the available space for payload 50 in payload module 16. Payload module 16 may include appropriate latching and locking mechanisms that withstand loads experienced during ascent while fairing 22 is in an extended position and during re-entry while fairing 22 is in a retracted position.

Payload module 16 includes one or more fairing actuators 70 coupled at a first end 72 to forward fairing 28 and at a second end 74 to aft fairing 26. Fairing actuator 70 operates to decrease the distance between first end 72 and second end 74 to move fairing 22 from an extended position to a retracted position. Fairing actuator 70 may include any appropriate mechanism to retract fairing 22, such as a ball screw, screw jack, wire and pulley system, coil spring, tension cable, or any other suitable electrical, mechanical, or pneumatic device that causes fairing 22 to retract or otherwise reduce in length. In a particular embodiment illustrated in FIG. 2, fairing actuator 70 includes a first threaded portion 76 extending from first end 72 to second end 74, and a second threaded portion 78 at second end 74 that engages first threaded portion 76. A motor 80 couples to second threaded portion 78 and, when activated, causes second threaded portion 78 to move first threaded portion 76 to retract fairing 22. Payload module 16 may include more than one fairing actuator 70 located around an inside perimeter of payload module 16 to drive fairing 22 at multiple points.

Payload module 16 also includes an elevator 80 having an elevator base 82 coupled to payload 50 or a payload dispenser, and at least one elevator actuator 84 coupled to elevator base 82. Generally, elevator 80 moves from a retracted position to an extended position to deploy payload 50 in either an axial or lateral manner. Elevator actuator 84, like fairing actuator 70, may include any appropriate mechanisms to raise and lower elevator base 82, such as a ball screw, screw jack, wire and pulley system, coil spring, tension cable, or any other electrical, mechanical, or pneumatic device. In a particular embodiment, elevator actuator 84 includes a first threaded portion 86 coupled to and extending along an axial length of aft fairing 24, and a second threaded portion 88 that engages first threaded portion 86. A motor 90 couples to second threaded portion 88 and, when activated, causes second threaded portion 88 to move along the length of first threaded portion 86 to move elevator base 82. Payload module 16 may include more than one elevator actuator 84 located around an inside perimeter of aft fairing 24 to drive elevator base 82 at multiple points.

Payload module 16 may also include any combination of separation bolts or other suitable clamps, fixtures, or other devices that fix components of payload module 16 in place during launch and ascent into orbit. Fairing separation bolts 92 fix fairing 22 in an extended position before payload deployment. A suitable number of fairing separation bolts 92 couple aft fairing 26 to forward fairing 28 about the perimeter of fairing 22 to withstand forces generated during launch and ascent of vehicle 10. Similarly, elevator separation bolts 94 fix elevator 80 in a retracted position before payload deployment. A suitable number of elevator separation bolts 92 couple elevator base 82 to base 20 to withstand forces generated during launch and ascent of vehicle 10. Separation bolts 92 and/or 94 fire to free components of payload module 16 in preparation for payload deployment. Payload module 16 may also include similar separation bolts or devices for cap 24.

Figure 3:
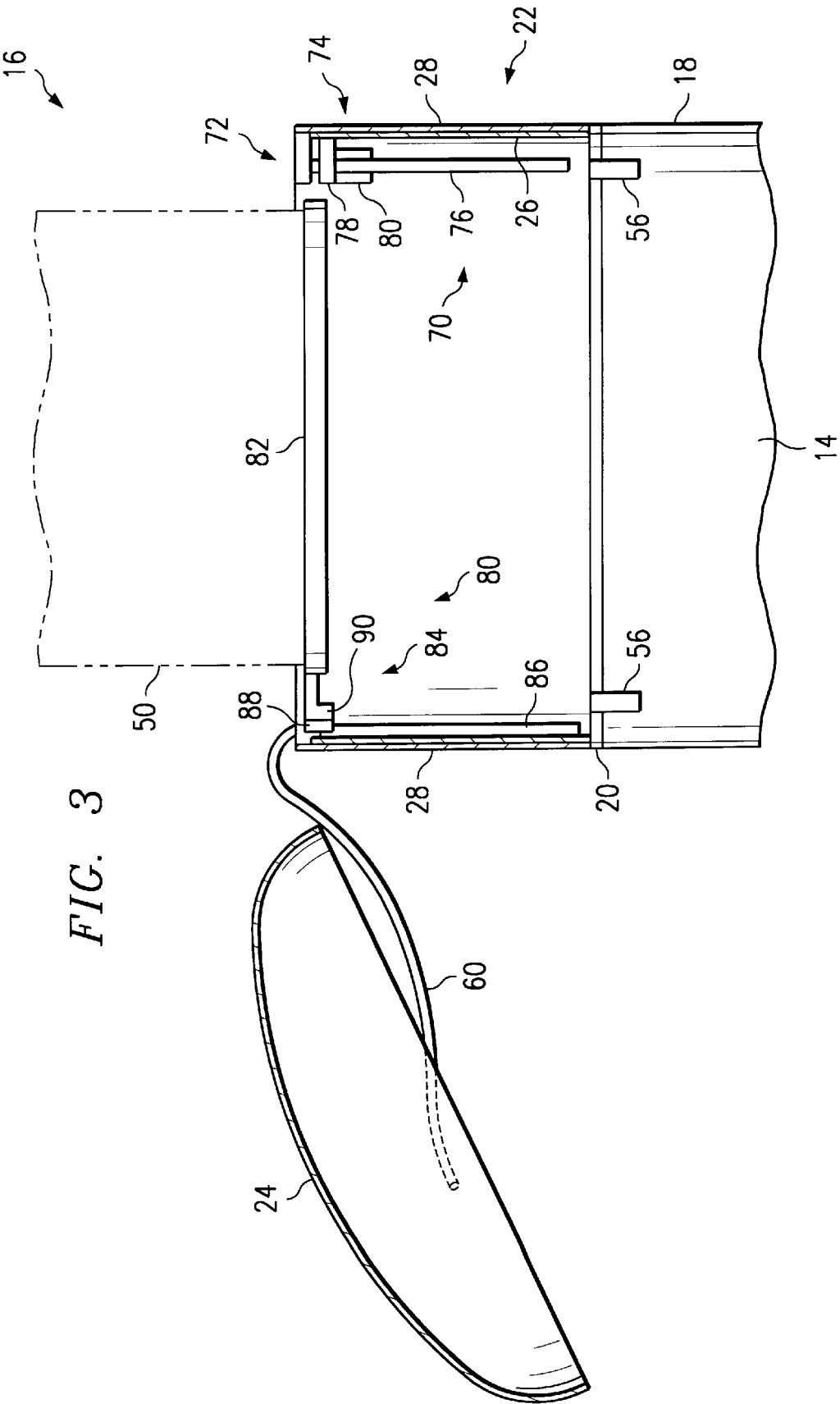
FIG. 3 illustrates in detail the payload module in a retracted position.

FIG. 3 illustrates fairing 22 in a retracted position in preparation for deployment of payload 50. With cap 24 open, fairing 22 retracted, and elevator 80 extended, payload module 16 supports both axial and lateral deployment of payload 50. In this configuration ends 72 and 74 of fairing actuator 70 are close together, and first threaded portion 76 extends downward along an axial length of aft fairing 24. When elevator 80 is in an extended position, second threaded portion 88 couples to first threaded portion 86 near the top of aft fairing 24. The low profile design and shape of hinge 60 near forward fairing 28 accommodates lateral deployment of payload 50.

FIG. 4 illustrates a top view of one particular embodiment of payload module 16 with cap 24 open. In this embodiment, payload module 16 includes three fairing actuators 70 located at approximately equal distances around the inside perimeter of fairing 22. Also, payload module 16 includes three elevator actuators 84 located at approximately equal distances around the inside perimeter of fairing 22. The use of multiple fairing actuators 70 and multiple base actuators 84 provides smooth and redundant fairing retraction and payload elevation operations, while reducing the chance for misalignments and malfunction. Although FIG. 4 illustrates three fairing actuators 70 and three base actuators 84, it should be understood that payload module 16 may include any number of fairing actuators 70 and base actuators 84 to provide the fairing retraction and payload elevation operations.

FIGS. 5A–5F illustrate a sequence of operation to deploy payload 50 from payload module 16. Fairing 22 in FIG. 5A is in an extended position with cap 24 closed and sealed to enclose payload 50. This is the configuration of fairing 22 during launch and ascent of vehicle 10 into space. Upon achieving a desired orbit to deploy payload 50, separation bolts 92 and/or 94 fire to free the movement of components of payload module 16. Payload module 16 moves cap 24 to an open position, as shown in FIG. 5B. It is possible at this point in the sequence to deploy payload 50 in an axial manner.

Forward fairing 28 retracts to place fairing 22 in a retracted position, as shown in FIG. 5C. Again, payload 50 may deploy in an axial manner at this point in the sequence, or wait for elevation of elevator base 82 to place payload 50 in a position that clears fairing 22, hinge 60, and cap 24, as shown in FIG. 5D. After deploying payload 50 (FIG. 5E), payload module 16 closes cap 24 in preparation for re-entry into the atmosphere with fairing 22 in the retracted position, as shown in FIG. 5F.

Figure 6:
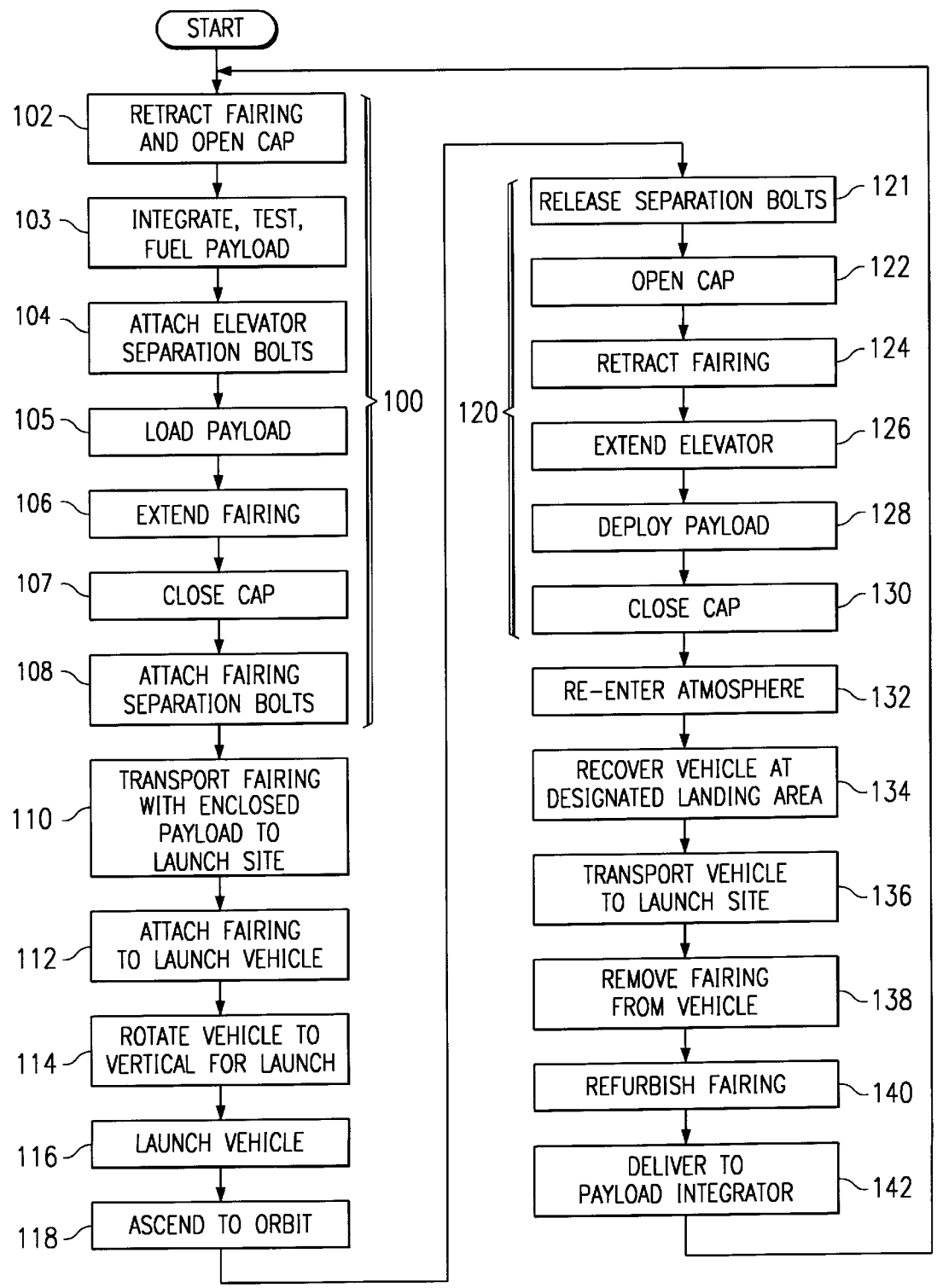
FIG. 6 is a flow chart of a method for reusing the payload module.

FIG. 6 illustrates a flow chart of a method for reusing payload module 16. The method begins at steps 100 which are performed in a clean room, low-contaminate environment, or other controlled environment. Payload module 16 retracts fairing 22 and opens cap 24 at step 102 in preparation for loading payload 50. Payload 50 is integrated, tested, and fueled at step 103, and elevator separation bolts 94 are attached at step 104. The method then loads payload 50 by coupling payload 50 to elevator base 82 using a payload dispenser or by direct mount at step 105. Payload module 16 extends fairing 22 at step 106 and closes and seals cap 24 at step 107. Fairing separation bolts 92 are attached at step 108. At this stage, payload module 16 and enclosed payload 50 represent a modular and sealed assembly for coupling to vehicle 14 before launch. In a particular embodiment, payload 50 and payload module 16 are in a horizontal orientation during steps 100.

The method may perform steps 100 at a controlled site remote from the launch facility, such as a site owned or operated by the payload developer, designer, integrator, or owner. If necessary, the method transports payload module 16 with enclosed payload 50 from the controlled environment to the launch facility at step 110. Payload module 16 attaches to vehicle 14 in either a horizontal or vertical orientation at step 112. Upon rotating launch vehicle 10 to a vertical orientation for launch at step 114, vehicle 10 launches at step 116. Vehicle 10 then ascends to a designated orbit at step 118. During ascent, payload module 16, and particularly cap 24 with suitable thermal protection materials, provides protection to payload 50 from aerodynamic heating and loads.

Upon achieving a desired orbit, the method performs steps 120 in space to deploy payload 50, as described above with reference to FIGS. 5A–5F. Payload module 16 fires or releases separation bolts 92 and/or 94 in any appropriate sequence at step 121. Payload module 16 opens cap 24 at step 122 and retracts fairing 22 at step 124. If necessary, payload module 16 extends elevator 80 to place payload 50 in a position that clears fairing 22, hinge 60, and cap 24 at step 126. Payload module 16 deploys payload 50 either laterally or axially at step 128. Payload module 16 then closes and seals cap 24 at step 130 in preparation for re-entry into the atmosphere at step 132.

Vehicle 14 with reduced length 32 due to fairing retraction re-enters the atmosphere with increased stability and steerability at step 132. Thermal protection materials protect payload module 16 and vehicle 14 from aerodynamic heating and loads during re-entry. The method recovers vehicle 14 at a designated landing area at step 134 and transports vehicle 14 to the launch facility or other remote site at step 136. The method removes payload module 16 from vehicle 14 at step 138, and refurbishes and tests payload module 16 at step 140. The method then delivers payload module 16 to a payload integrator at step 142 for another launch.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A payload module coupled to a forward end of a re-entry vehicle, the payload module comprising:

a fairing having an extended position to contain a payload and a retracted position for re-entry into the atmosphere; and a cap coupled to the fairing, the cap having a closed position to contain the payload and an open position to deploy the payload.

2. The payload module of claim 1, wherein the fairing comprises:

an aft fairing of a first diameter; and a forward fairing of a second diameter greater than the first diameter so that the forward fairing can move over the aft fairing to the retracted position.

3. The payload module of claim 2, wherein the second diameter is approximately equal to the diameter of the forward end of the vehicle.

4. The payload module of claim 1, wherein the fairing comprises:

an aft fairing of a first diameter;

a forward fairing of a second diameter greater than the first diameter so that forward fairing can move over the aft fairing to the retracted position; and a fairing actuator having a first end coupled to the forward fairing and a second end coupled to the aft fairing, the fairing actuator operable to move the first end closer to the second end.

5. The payload module of claim 1, further comprising a base coupled to the fairing, wherein the base removably couples to the forward end of the vehicle.

6. The payload module of claim 1, further comprising:

a base coupled to the fairing; and an elevator coupled to the base, the elevator having a retracted position and an extended position to deploy the payload.

7. The payload module of claim 1, wherein the retracted position of the fairing moves a center of pressure aft to improve the stability of the vehicle.

8. A payload module removably coupled to a forward end of a re-entry vehicle, the payload module comprising:

a fairing operable to contain a payload during ascent of the vehicle and to withstand aerodynamic heating from the atmosphere upon re-entry of the vehicle;

a cap having a closed position to contain the payload and an open position to deploy the payload;

a hinge coupled to the fairing and the cap, the hinge having a first pivot adjacent the fairing and a second pivot adjacent the cap, wherein the hinge moves about the first pivot and the second pivot to move the cap from a closed position to an open position;

a base coupled to the fairing; and a plurality of fasteners removably coupling the base to the forward end of the vehicle.

9. The payload module of claim 8, wherein the payload module is reusable.

10. The payload module of claim 8, wherein the fairing comprises:

an aft fairing of a first diameter;

a forward fairing of a second diameter greater than the first diameter so that the forward fairing can move over the aft fairing to reduce the length of the fairing for re-entry; and a fairing actuator having a first end coupled to the forward fairing and a second end coupled to the aft fairing, the fairing actuator operable to move the first end closer to the second end.

11. The payload module of claim 8, further comprising a base coupled to the fairing, wherein the base removably couples to the forward end of the vehicle.

12. The payload module of claim 8, further comprising:

a base coupled to the fairing; and an elevator coupled to the base, the elevator having a retracted position and an extended position to deploy the payload.

13. The payload module of claim 10, wherein the fairing actuator moves a center of pressure aft to improve the stability of the vehicle.

14. The payload module of claim 8, wherein the cap is of a unitary construction to enclose the forward end of the fairing.

15. The payload module of claim 8, wherein:

the fairing is substantially cylindrical; and the cap is substantially cylindrical and comprises a first end having a blunt nosed curvature and a second end adjacent to the forward end of the fairing having a radius equal to a radius of the forward end of the fairing.

16. The payload module of claim 12, wherein the extended position allows lateral deployment of the payload.

17. A method for deploying a payload using a payload module having a fairing and a cap, the method comprising:

opening the cap coupled to a forward end of the fairing;

moving the fairing from an extended position to a retracted position;

deploying the payload; and closing the cap in preparation for re-entry into the atmosphere.

18. The method of claim 17, wherein moving the fairing comprises moving a forward fairing of a first diameter over an aft fairing of a second diameter less than the first diameter.

19. The method of claim 17, further comprising moving an elevator to an extended position before deploying the payload.

20. The method of claim 17, wherein moving the fairing comprises operating a fairing actuator to move a first end coupled to a forward fairing closer to a second coupled to an aft fairing.

21. The method of claim 17, further comprising the following steps performed before opening a cap:

coupling the payload to the payload module;

coupling the payload module to a forward end of a reentry vehicle; and launching the vehicle into space.

22. The method of claim 21, wherein the steps of coupling are performed while the payload module is in a horizontal orientation.

23. The method of claim 17, further comprising the following steps performed after closing the cap:

directing a re-entry vehicle coupled to the payload module through the atmosphere to a designated landing area;

recovering the vehicle;

decoupling the payload module from the vehicle.

24. The method of claim 23, further comprising the step of transporting the payload module to a remote site for further payload integration.

25. A method for deploying a payload using a payload module having a cap, the method comprising:

removably coupling a payload module containing the payload to a forward end of a re-entry vehicle;

coupling the cap to a forward end of the payload module using a hinge having a first pivot adjacent the forward end of the payload module and a second pivot adjacent the cap;

opening the cap by moving the hinge about the first pivot and the second pivot;

deploying the payload; and closing the cap in preparation for re-entry into the atmosphere.

26. The method of claim 25, wherein the step of removably coupling is performed while the payload module is in a horizontal orientation.

27. The method of claim 25, further comprising the step of moving an elevator to an extended position before deploying the payload.

28. The method of claim 25, further comprising the following steps performed before removably coupling a payload module to the vehicle:

coupling the payload to the payload module at a site remote from a launch facility; and transporting the payload module and the payload from the site to the launch facility.

29. The method of claim 25, further comprising the following steps performed after closing the cap:

directing the vehicle through the atmosphere to a designated landing area;

recovering the vehicle;

decoupling the payload module from the vehicle.

30. The method of claim 25, wherein the cap is of a unitary construction to enclose the forward end of the payload module.

31. The method of claim 25, wherein:

the payload module is substantially cylindrical; and the cap is substantially cylindrical and comprises a first end having a blunt nosed curvature and a second end adjacent to the forward end of the payload module having a radius equal to a radius of the forward end of the payload module.

32. The method of claim 27, wherein deploying the payload comprises laterally deploying the payload.

33. A space vehicle, comprising:

a booster stage;

a re-entry vehicle;

a base coupled to the forward end of the re-entry vehicle;

an aft fairing coupled to the base and having a first diameter;

a forward fairing coupled to the aft fairing and having a second diameter greater than the first diameter;

a plurality of fairing actuators located around an inside perimeter of the aft fairing and forward fairing, each fairing actuator having a first end coupled to the forward fairing and a second end coupled to the aft fairing, each fairing actuator operable to move the forward fairing from an extended position to contain a payload to a retracted position for re-entry into the atmosphere; and a cap coupled to the forward fairing, the cap having a closed position to contain the payload and an open position to deploy the payload.

34. The space vehicle of claim 33, wherein the second diameter is approximately equal to the diameter of the forward end of the re-entry vehicle.

35. The space vehicle of claim 33, wherein each fairing actuator comprises:

a first threaded portion extending from the first end to the second end;

a second threaded portion at the second end to engage the first threaded portion; and a motor coupled to the second threaded portion.

36. The space vehicle of claim 33, further comprising an elevator coupled to the base, the elevator having a retracted position and an extended position to deploy the payload.

37. The space vehicle of claim 33, further comprising an elevator coupled to the base, the elevator comprising:

an elevator base; and a plurality of elevator actuators located around an inside perimeter of the aft fairing and the forward fairing, each elevator actuator operable to move the base from a retracted position to an extended position to deploy the payload.

38. The space vehicle of claim 37, wherein each elevator actuator comprises:

a first threaded portion extending along an axial length of the aft fairing;

a second threaded portion to engage the first threaded portion; and a motor coupled to the second threaded portion.

39. The space vehicle of claim 33, wherein the retracted position of the forward fairing moves the center of pressure aft to improve the stability of the vehicle.

40. The space vehicle of claim 33, further comprising a hinge coupled to the cap and the forward fairing.

* * * * *